United States Patent
Lee et al.

(10) Patent No.: US 11,772,119 B2
(45) Date of Patent: Oct. 3, 2023

(54) MULTI-SLOT DIE COATER WITH IMPROVED MANIFOLD

(71) Applicant: LG Energy Solution, Ltd., Seoul (KR)

(72) Inventors: Taek-Soo Lee, Daejeon (KR); Shin-Wook Jeon, Daejeon (KR); Sang-Hoon Choy, Daejeon (KR)

(73) Assignee: LG Energy Solution, Ltd.

( * ) Notice: Subject to any disclaimer, the term of this patent is extended or adjusted under 35 U.S.C. 154(b) by 0 days.

(21) Appl. No.: 17/918,433

(22) PCT Filed: Aug. 25, 2021

(86) PCT No.: PCT/KR2021/011399
§ 371 (c)(1),
(2) Date: Oct. 12, 2022

(87) PCT Pub. No.: WO2022/065710
PCT Pub. Date: Mar. 31, 2022

(65) Prior Publication Data
US 2023/0136243 A1    May 4, 2023

(30) Foreign Application Priority Data

Sep. 25, 2020   (KR) .................. 10-2020-0125181

(51) Int. Cl.
*B05C 5/02* (2006.01)
*H01M 4/04* (2006.01)

(52) U.S. Cl.
CPC .......... *B05C 5/0254* (2013.01); *H01M 4/0404* (2013.01)

(58) Field of Classification Search
None
See application file for complete search history.

(56) References Cited

U.S. PATENT DOCUMENTS

| | | | |
|---|---|---|---|
| 5,234,500 | A | 8/1993 | Korokeyi |
| 5,252,137 | A | 10/1993 | Tateyama et al. |

FOREIGN PATENT DOCUMENTS

| | | |
|---|---|---|
| CN | 210079946 U | 2/2020 |
| JP | H09276771 A | 10/1997 |
| JP | 2892476 B2 | 5/1999 |
| JP | 2000334357 A | 12/2000 |

(Continued)

OTHER PUBLICATIONS

English translation of Written Opinion for equivalent International App. No. PCT/KR2021/011399.*

(Continued)

*Primary Examiner* — Charles Capozzi
(74) *Attorney, Agent, or Firm* — Lerner David LLP

(57) ABSTRACT

There is provided a multi-slot die coater including a manifold for a uniform flow of an electrode active material slurry without stagnation. The multi-slot die coater of the present disclosure includes a first manifold in which a first coating solution is received and a second manifold in which a second coating solution is received. The first manifold is a chamber of an inwardly recessed shape, and includes a first surface and a second surface having different angles to a lower slot at a location close to the lower slot, and the angle of the first surface closest to the lower slot is formed at a level of 30~70% of the second surface following the first surface.

10 Claims, 9 Drawing Sheets

(56) References Cited

FOREIGN PATENT DOCUMENTS

| | | |
|---|---|---|
| JP | 2001224998 A | 8/2001 |
| JP | 200286045 A | 3/2002 |
| JP | 2009-112940 A | 5/2009 |
| JP | 5157486 B2 | 3/2013 |
| JP | 2013-99741 A | 5/2013 |
| JP | 2015-188852 A | 11/2015 |
| JP | 2020131082 A | 8/2020 |
| KR | 20070098715 A | 10/2007 |
| KR | 102143345 B1 | 8/2020 |

OTHER PUBLICATIONS

International Search Report for Application No. PCT/KR2021/011399 dated Dec. 7, 2021, pp. 1-3.

* cited by examiner

MULTI-SLOT DIE COATER WITH IMPROVED MANIFOLD

CROSS-REFERENCE TO RELATED APPLICATIONS

This application is a national phase entry under 35 U.S.C. § 371 of International Application No. PCT/KR2021/011399, filed on Aug. 25, 2021, which claims priority from Korean Patent Application No. 10-2020-0125181, filed on Sep. 25, 2020, the disclosures of which are incorporated herein by reference.

TECHNICAL FIELD

The present disclosure relates to a multi-slot die coater capable of simultaneously forming two or more layers by wetting, and more particularly, to a multi-slot die coater with improved productivity.

BACKGROUND ART

With the increasing technology development and the growing demand for mobile devices, the demand for secondary batteries as an energy source is rapidly increasing, and such secondary batteries essentially include an electrode assembly which is a power generation element. The electrode assembly includes a positive electrode, a separator and a negative electrode stacked at least once, and the positive electrode and the negative electrode are manufactured by coating and drying a positive electrode active material slurry and a negative electrode active material slurry on a current collector made of an aluminum foil and a current collector made of a copper foil, respectively. For the uniform charging/discharging characteristics of the secondary batteries, it is necessary to uniformly coat the positive electrode active material slurry and the negative electrode active material slurry on the current collector, and slot die coaters have been used.

The electrode manufacturing method using the slot die coater includes applying the electrode active material slurry issuing from the slot die coater to the current collector transferred by a coating roll. The conventional slot die coater includes two dies and a slot between the two dies, and may dispense one type of electrode active material slurry through one slot to form a layer of electrode active material.

To manufacture the secondary batteries with high energy density, the thickness of the electrode active material layer which was about 130 μm has gradually increased up to 300 μm. When the thick electrode active material layer is formed with the conventional slot die coater, a binder and a conductive material in the active material slurry migrate fast during drying, and the finally manufactured electrode is not uniform. To solve this problem, when applying the electrode active material layer at a small thickness and drying and repeating this process thereon, it takes a long time to perform coating twice. To improve both electrode performance and productivity, the inventors have proposed a dual slot die coater capable of simultaneously applying two types of electrode active material slurries.

FIG. 1 is a schematic cross-sectional view of the conventional dual slot die coater, FIG. 2 is a perspective view of a lower die block of the dual slot die coater of FIG. 1, and FIG. 3 is an enlarged diagram of section A in FIG. 1.

Referring to FIG. 1, two electrode active material layers may be formed on a current collector 15 by applying 2 types of electrode active material slurries from the dual slot die coater 20 while rotating a coating roll 10 to move the current collector 15. The electrode active material slurry coming out of the dual slot die coater 20 is applied over one surface of the current collector 15 to form the electrode active material layer.

The dual slot die coater 20 is constructed by assembling three plate members, i.e., three die blocks 21, 22, 23. Slots are formed between the adjacent die blocks, two slots are formed, and the two types of electrode active material slurries are simultaneously dispensed through exit ports 24, 25, each in communication with each slot, so two electrode active material layers may be simultaneously formed by continuously applying an additional electrode active material slurry on the electrode active material layer formed by the previously coated electrode active material slurry. The reference numbers 26, 27 indicate manifolds in which a coating solution is received.

According to the coating method using the dual slot die coater 20, inside the die blocks 21, 22, 23, the manifolds 26, 27 are filled with the electrode active material slurry, and the electrode active material slurry is coated through the exit ports 24, 25. For long-term coating and high productivity, the uniform flow of the electrode active material slurry in the manifolds 26, 27 without stagnation is required.

In the currently available dual slot die coater 20, the shape of the manifold 26 formed in the die block 21 is shown in the perspective view of FIG. 2. To apply in a uniform coating amount in the widthwise direction of the current collector 15, the manifold 26 has a large chamber shape. Referring to FIGS. 2 and 3 together, a surface 26a close to the exit port 24 is a straight line shape in cross section along the movement direction of the current collector 15 in the manifold 26, and its angle to a landing area 21a is constantly θ, and the landing area 21a is an area to the front end of the die block 21.

When the flow of the electrode active material slurry in the manifold 26 is uniform, the coating quality is good. When the electrode active material slurry stays or moves slowly at an area in the manifold 26, the electrode active material slurry in the manifold 26 may agglomerate during a long-term use, causing a change to the flow and consequential widthwise loading deviation, or the electrode active material slurry agglomerates may clog the exit port, and the coating surface may be ununiform, causing surface defects. However, this problem often occurs in the manifold 26 provided in the conventional dual slot die coater 20, so there is a need for a solution to the problem.

DISCLOSURE

Technical Problem

The present disclosure is designed to solve the above-described problem, and therefore the present disclosure is directed to providing a multi-slot die coater including a manifold for a uniform flow of an electrode active material slurry without stagnation.

However, the technical problems to be solved by the present disclosure are not limited to the above problems, and other problems that are not mentioned will be clearly understood by those skilled in the art from the description of the invention described below.

Technical Solution

To solve the above-described technical problem, a multi-slot die coater of the present disclosure is a multi-slot die coater including a lower slot and an upper slot to extrude and coat a coating solution on a surface of a continuously moving substrate through at least one of the lower slot or the upper slot, and the multi-slot die coater includes a lower die block, an intermediate die block positioned on the lower die block such that the lower slot is formed between the intermediate die block and the lower die block, and an upper die block positioned on the intermediate die block such that the upper slot is formed between the upper die block and the intermediate die block; a first manifold provided in the lower die block or the intermediate die block, the first manifold in which a first coating solution is received, the first manifold being in communication with the lower slot; and a second manifold provided in the upper die block or the intermediate die block, the second manifold in which a second coating solution is received, the second manifold being in communication with the upper slot, wherein the first manifold is a chamber of an inwardly recessed shape, and includes a first surface and a second surface at a location close to the lower slot, the first surface and the second surface having different angles to the lower slot, and of the two surfaces, the angle of the first surface closest to the lower slot is formed at a level of 30~70% of the second surface following the first surface.

The first surface may be 15 mm or less in length.

The angle between the first surface and the lower slot may be between 20° and 60°.

In a preferred example, the angle between the first surface and the lower slot is 30°, and the angle between the second surface and the lower slot is 60°.

In the multi-slot die coater according to the present disclosure, the second manifold may be a chamber of an inwardly recessed shape, and may include a third surface and a fourth surface at a location close to the upper slot, the third surface and the fourth surface having different angles to the upper slot, and of the two surfaces, the angle of the third surface closest to the upper slot may be formed at a level of 30~70% of the fourth surface following the third surface.

The third surface may be 15 mm or less in length.

The angle between the third surface and the upper slot may be between 20° and 60°.

The angle between the third surface and the upper slot may be 30°, and the angle between the fourth surface and the upper slot may be 60°.

In the present disclosure the lower slot and the upper slot may form an angle of 30° to 60°.

The intermediate die block may have a right-angled triangular shape in cross section along a movement direction of the substrate, and the first manifold may be provided in the lower die block and the second manifold may be provided in the upper die block.

The lower die block, the intermediate die block and the upper die block include a lower die lip, an intermediate die lip and an upper die lip that form front ends thereof, respectively. A lower exit port is formed between the lower die lip and the intermediate die lip and is in communication with the lower slot, and an upper exit port is formed between the intermediate die lip and the upper die lip and is in communication with the upper slot. The multi-slot die coater may further include a first spacer interposed between the lower die block and the intermediate die block to adjust the width of the lower slot, and a second spacer interposed between the intermediate die block and the upper die block to adjust the width of the upper slot.

Advantageous Effects

According to the present disclosure, the flow of the electrode active material slurry in the manifold is uniform. The residence time of the electrode active material slurry at any area in the manifold is minimized, thereby preventing agglomeration of the electrode active material slurry. As a result, it is possible to prevent widthwise loading deviation or the clogged exit port by the electrode active material slurry agglomerates due to the changed flow.

Accordingly, according to the present disclosure, the flow of the electrode active material slurry is uniform without stagnation, thereby ensuring long-term coating and high productivity. Since the agglomeration of the electrode active material slurry is avoided, it is possible to prevent coating surface defects. Accordingly, it is possible to improve the coating quality of products.

According to the present disclosure, the gentle slope at the end of the manifold allows the electrode active material slurry to come out smoothly. The multi-slot die coater including the manifold may uniformly form the electrode active material layer at a desired thickness, and preferably it is possible to coat at least two types of electrode active material slurries at the same time, thereby achieving high performance and productivity.

When the multi-slot die coater of the present disclosure is used to manufacture an electrode of a secondary battery by coating an electrode active material slurry on a current collector while moving the current collector, it is possible to achieve uniform coating under high-speed or wide-scale coating conditions.

DESCRIPTION OF DRAWINGS

The accompanying drawings illustrate a preferred embodiment of the present disclosure and together with the detailed description of the present disclosure, serve to provide further understanding of the technical features of the present disclosure, and thus, the present disclosure is not construed as being limited to the drawing.

BEST MODE

Figure 1:
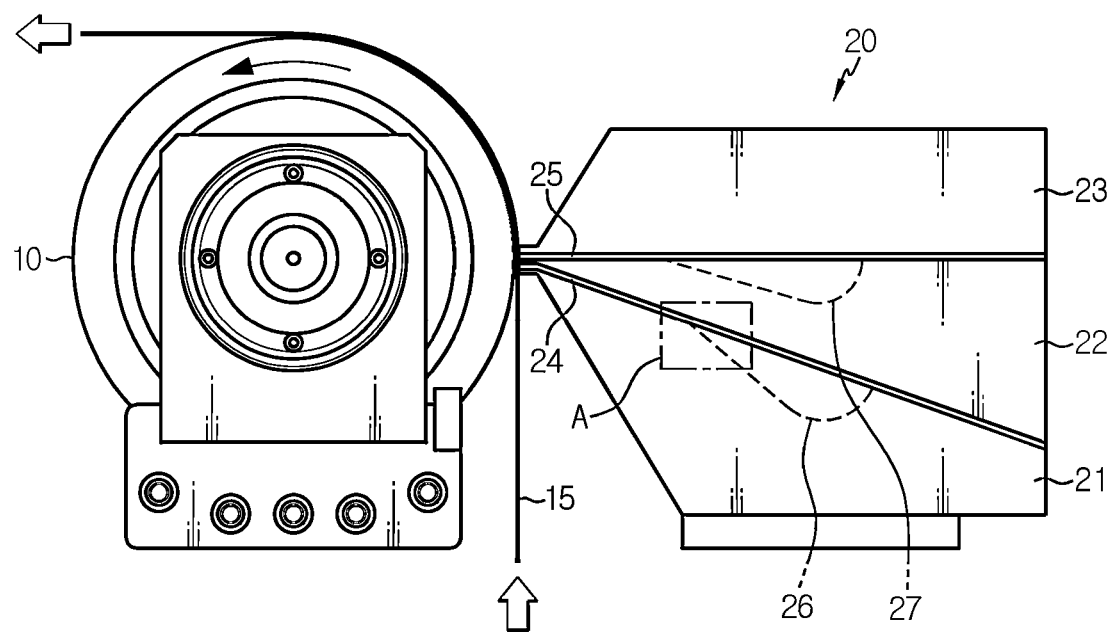
FIG. 1 is a schematic cross-sectional view of a dual slot die coater according to the related art.
Figure 2:
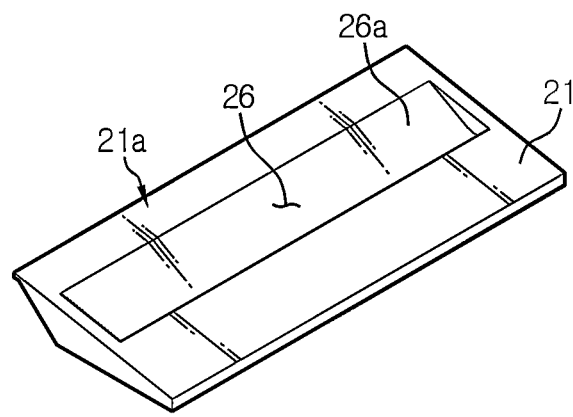
FIG. 2 is a perspective view of a lower die block of the dual slot die coater of FIG. 1.

Hereinafter, preferred embodiments of the present disclosure will be described in detail with reference to the accompanying drawings. Prior to the description, it should be understood that the terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the embodiments described herein and illustrations in the drawings are just some preferred embodiments of the present disclosure and do not fully describe the technical features of the present disclosure, so it should be understood that a variety of other equivalents and modifications could have been made thereto at the time of filing the patent application.

A multi-slot die coater of the present disclosure may include two or more slots. Basically, the multi-slot die coater is an apparatus including a lower slot and an upper slot to coat a coating solution in a double layer on a substrate. The 'substrate' described below is a current collector and the coating solution is an 'electrode active material slurry'. Both a first coating solution and a second coating solution are electrode active material slurries, and they may have the same or different compositions (types of an active material, a conductive material and a binder), amounts (amounts of the active material, the conductive material and the binder) or properties. The multi-slot die coater of the present disclosure is optimized for electrodes manufactured by applying at least two types of electrode active material slurries at the same time or by pattern coating of applying at least two types of electrode active material slurries in an alternating manner. However, the scope of the present disclosure is not necessarily limited thereto. For example, the substrate may be a porous support that constitutes a separator, and the first coating solution and the second coating solution may be organics having different compositions or properties. That is, in case that thin film coating is required, the substrate, the first coating solution and the second coating solution are not limited to particular types.

Figure 4:
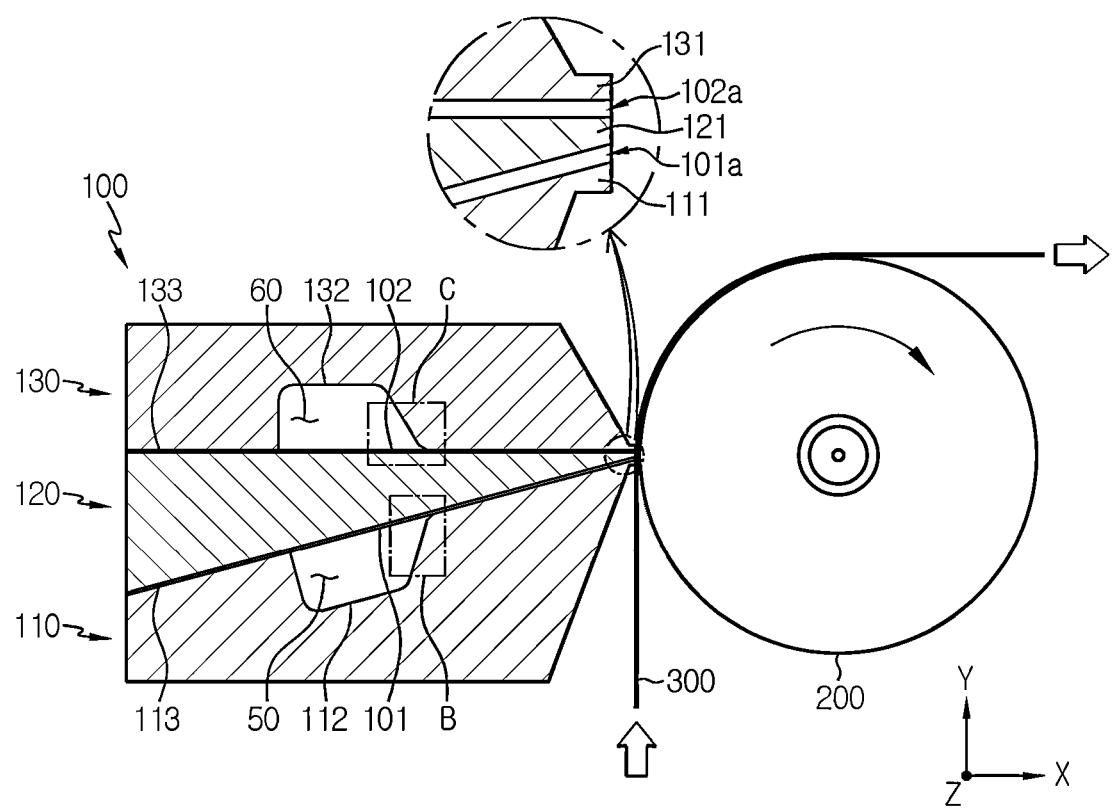
FIG. 4 is a schematic cross-sectional view of a multi-slot die coater according to an embodiment of the present disclosure.
Figure 5:
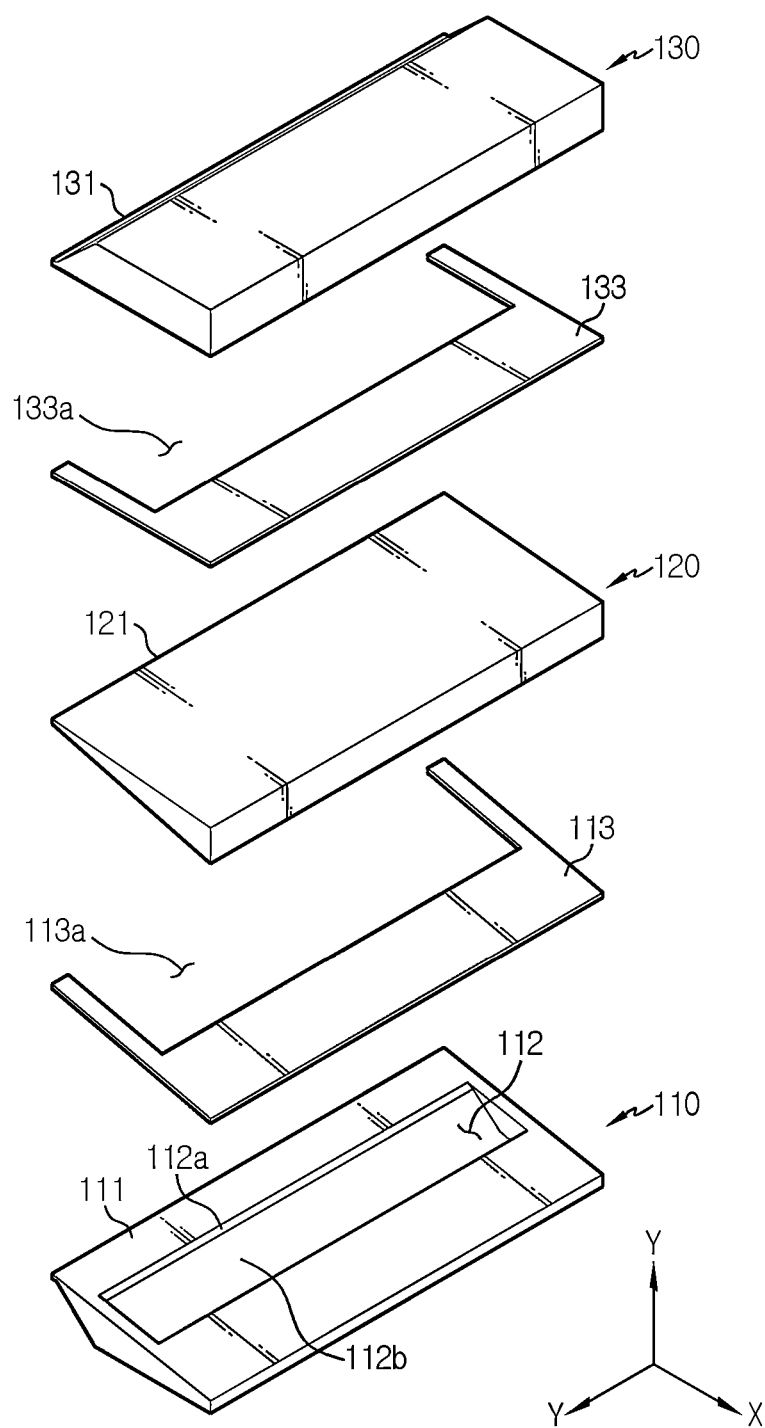
FIG. 5 is a schematic exploded perspective view of a multi-slot die coater according to an embodiment of the present disclosure.
Figure 6:
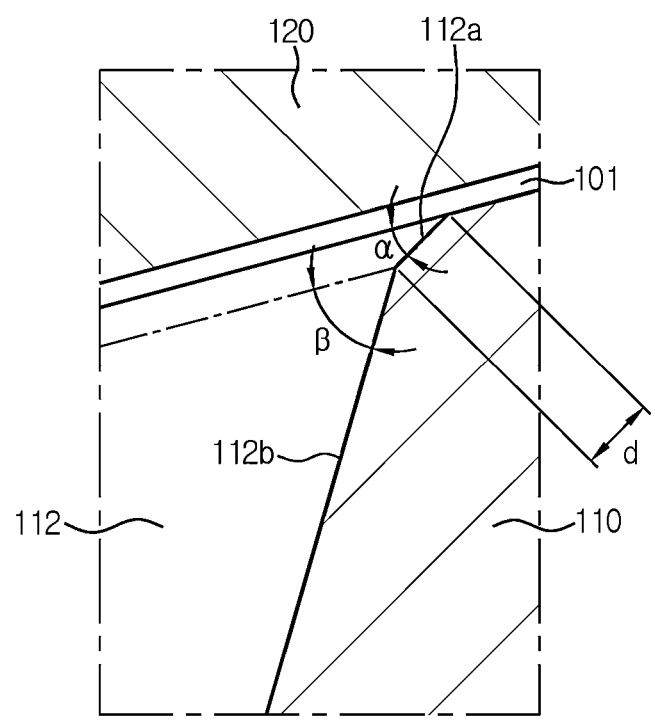
FIG. 6 is an enlarged diagram of section B in FIG. 4.

FIG. 4 is a schematic cross-sectional view of the multi-slot die coater according to an embodiment of the present disclosure. FIG. 5 is a schematic exploded perspective view of the multi-slot die coater according to an embodiment of the present disclosure. FIG. 6 is an enlarged diagram of Section B in FIG. 4.

The multi-slot die coater 100 according to the present disclosure is a dual slot die coater including a lower slot 101 and an upper slot 102, and is an apparatus capable of simultaneously or alternately coating a same type of coating solution or two different types of coating solutions on a substrate 300 through the lower slot 101 and the upper slot 102. Referring to FIGS. 4 and 5, the multi-slot die coater 100 includes a lower die block 110, an intermediate die block 120 positioned on the lower die block 110, and an upper die block 130 positioned on the intermediate die block 120. The die blocks 110, 120, 130 are assembled one another though a fastening member (not shown) such as bolts.

The lower die block 110 is the lowermost block among the blocks of the multi-slot die coater 100, and the surface facing the intermediate die block 120 is inclined at an angle of approximately 30° to 60° to the bottom surface (X-Z plane).

The lower slot 101 may be formed at a location in which the lower die block 110 and the intermediate die block 120 are in contact with each other. For example, a first spacer 113 is interposed between the lower die block 110 and the intermediate die block 120 to form a gap between, and the lower slot 101 corresponding to a passage through which the first coating solution 50 may flow may be formed. In this case, the thickness of the first spacer 113 determines the vertical width (Y-axis direction, the slot gap) of the lower slot 101.

As shown in FIG. 5, the first spacer 113 has a first opening portion 113a which is cut at an area, and may be interposed in the remaining portion except one side in the edge area of the facing surface of each of the lower die block 110 and the intermediate die block 120. Accordingly, a lower exit port 101a through which the first coating solution 50 emerges is only formed between the front end of the lower die block 110 and the front end of the intermediate die block 120. The front end of the lower die block 110 and the front end of the intermediate die block 120 are defined as a lower die lip 111 and an intermediate die lip, respectively, and in other words, the lower exit port 101a is formed by the spacing between the lower die lip 111 and the intermediate die lip 121.

For reference, the first spacer 113 acts as a gasket to prevent the leakage of the first coating solution 50 through the gap between the lower die block 110 and the intermediate die block 120 except the area where the lower exit port 101a is formed, and thus the first spacer 113 is preferably made of a material having sealing ability.

The lower die block 110 includes a first manifold 112 having a predetermined depth on the surface facing the intermediate die block 120, and the first manifold 112 is in communication with the lower slot 101. Although not shown in the drawings, the first manifold 112 is connected to a first coating solution supply chamber (not shown) installed outside with a supply pipe and is supplied with the first coating solution 50. When the first manifold 112 is fully filled with the first coating solution 50, the flow of the first coating solution 50 is guided along the lower slot 101 and comes out of the lower exit port 101a.

The intermediate die block 120 is a block in the middle of the blocks of the multi-slot die coater 100, and is a block interposed between the lower die block 110 and the upper die block 130 to form a dual slot. The intermediate die block 120 of this embodiment is a right-angled triangle in cross section. According to another embodiment, the intermediate die block 120 may be, for example, an isosceles triangle in cross section.

The upper die block 130 is positioned in contact with the upper surface of the intermediate die block 120 parallel to the bottom surface. The upper slot 102 is formed at a location in which the intermediate die block 120 and the upper die block 130 are in contact with each other.

In the same way as the lower slot 101 described above, a second spacer 133 may be interposed between the intermediate die block 120 and the upper die block 130 to form a gap between. Accordingly, the upper slot 102 corresponding to a passage through which a second coating solution 60 may flow is formed. In this case, the vertical width (Y-axis direction, the slot gap) of the upper slot 102 is determined by the second spacer 133.

In addition, the second spacer 133 having the similar structure to the first spacer 113 has a second opening portion 133a which is cut at an area, and is interposed in the remaining portion except one side in the edge area of the facing surface of each of the intermediate die block 120 and the upper die block 130. Likewise, the circumferential direction except the front side of the upper slot 102 is blocked, and the upper exit port 102a is only formed between the front end of the intermediate die block 120 and the front end of the upper die block 130. The front end of the upper die block 130 is defined as an upper die lip 131, and in other words, the upper exit port 102a is formed by the spacing between the intermediate die lip 121 and the upper die lip 131.

In addition, the upper die block 130 includes a second manifold 132 having a predetermined depth on the surface facing the intermediate die block 120, and the second manifold 132 is in communication with the upper slot 102. Although not shown in the drawings, the second manifold 132 is connected to a second coating solution supply chamber installed outside with a supply pipe and is supplied with the second coating solution 60. When the second coating solution 60 is supplied from the external source along the supply pipe, and the second manifold 132 is fully filled with the second coating solution 60, the flow of the second coating solution 60 is guided along the upper slot 102 in communication with the second manifold 132 and comes out of the upper exit port 102a.

The upper slot 102 and the lower slot 101 form an angle, and the angle may be approximately 30° to 60°. The upper slot 102 and the lower slot 101 may intersect at one point, and the upper exit port 102a and the lower exit port 101a may be provided near the intersection point. Accordingly, the locations at which the first coating solution 50 and the second coating solution 60 emerge may be concentrated on approximately one point.

In this embodiment, the first and second manifolds 112, 132 are respectively formed in the lower die block 110 and the upper die block 130. By doing so, deformation of the most structurally vulnerable intermediate die block 120 may be less affected. In another example, the first manifold 112 may be formed in the lower die block 110, and the second manifold 132 may be formed in the intermediate die block 120. In still another example, both the first manifold 112 and the second manifold 132 may be formed in the intermediate die block 120.

According to the multi-slot die coater 100 having such a configuration, a rotatable coating roll 200 is positioned on the front side of the multi-slot die coater 100, and the coating roll 200 may be rotated to move the substrate 300 to be coated, while continuously contacting the first coating solution 50 and the second coating solution 60 with the surface of the substrate 300, and thereby the substrate 300 may be coated in a double layer. Alternatively, pattern coating may be intermittently formed on the substrate 300 by performing the supply and stop of the first coating solution 50 and the supply and stop of the second coating solution 60 in an alternating manner.

The multi-slot die coater 100 extrudes and coats the coating solution on the surface of the continuously moving substrate 300 through at least one of the lower slot 101 or the upper slot 102. As shown in FIGS. 5 and 6, the first manifold 112 is a chamber of an inwardly recessed shape, and includes a first surface 112a and a second surface 112b having different angles to the lower slot 101 at a location close to the lower slot 101.

Of the two surfaces, the angle of the first surface 112a close to the lower slot 101 is formed at the level of 30~70% of the second surface 112b following the first surface 112a. That is, when an angle between the first surface 112a and the lower slot 101 is $\alpha$ and an angle between the second surface 112b and the lower slot 101 is $\beta$, $\alpha$ is at the level of 30~70% of $\beta$, and $\alpha$ is smaller than $\beta$. That is, the first surface 112a close to the lower exit port 101a slopes more gently than the second surface 112b. When $\alpha$ is at the level of 30% or less or 70% or more relative to $\beta$, it does not help to solve the stagnation of the first coating solution 50.

The length d of the first surface 112a may be 15 mm or less. Preferably, the length d of the first surface 112a is not more than 15 mm. When the first surface 112a having a gentle slope is longer than 15 mm, rather stagnation of the electrode active material slurry may occur.

The angle $\alpha$ between the first surface 112a and the lower slot 101 may be between 20° and 60°. When $\alpha$ is less than 20° or more than 60°, it does not help to solve the stagnation of the first coating solution 50.

In a preferred example, the angle $\alpha$ between the first surface 112a and the lower slot 101 maybe 30°, and the angle $\beta$ between the second surface 112b and the lower slot 101 may be 60°. In this case, $\alpha$ is at the level of 50% of $\beta$.

Figure 3:
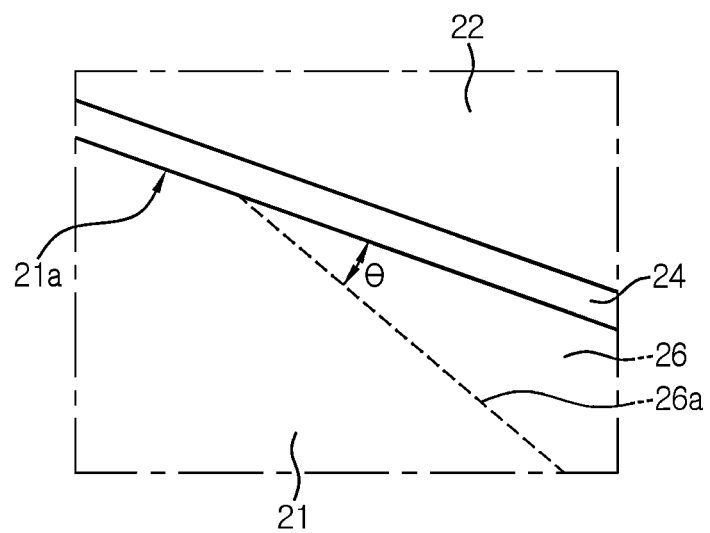
FIG. 3 is an enlarged diagram of section A in FIG. 1.

The present disclosure is aimed at minimizing the residence of the electrode active material slurry in the manifold. To achieve this object, in the multi-slot die coater 100 according to the present disclosure, the first manifold 112 includes the first surface 112a and the second surface 112b on the inner surface in the area in which the first coating solution 50 is supplied to the lower exit port 101a, and as shown in FIG. 3, as opposed to the conventional manifold 26 of which the surface 26a close to the exit port 24 is a straight line shape in cross section along the movement direction of the current collector 15, the present disclosure is characterized as a multi-angled shape, not a straight line. That is, it corresponds to the gentle slope at the end of the area of supply to the lower exit port 101a in the first manifold 112. For uniform loading, the manifold has different angles of inclination at the end. While the angle of inclination of the end of the conventional manifold 26 is $\theta$ and is uniformly maintained (see FIG. 3), in the present disclosure, the angle of inclination of a part of the end of the first manifold 112 is $\beta$, and the angle of inclination of the end is $\alpha$ which is smaller than $\beta$. That is, the gently inclined end is designed to allow the first coating solution 50 or the electrode active material slurry to come out smoothly. According to the present disclosure, the flow of the first coating solution 50 in the first manifold 112 is uniform, and the residence time is minimized.

Figure 7:
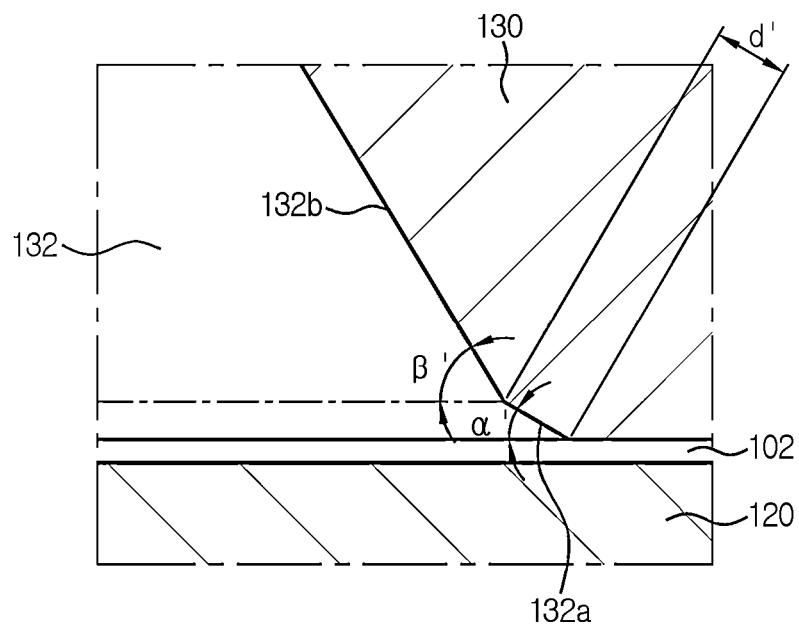
FIG. 7 is an enlarged diagram of section C in FIG. 4.

FIG. 7 is an enlarged diagram of section C in FIG. 4. In the same way as the first manifold 112, the second manifold 132 may include a third surface 132a and a fourth surface 132b having different angles.

As shown in FIG. 7, the second manifold 132 is a chamber of an inwardly recessed shape, and includes the third surface 132a and the fourth surface 132b having different angles to the upper slot 102 at a location close to the upper slot 102. Here, the third surface 132a may correspond to the first surface 112a of the first manifold 112 and the fourth surface 132b may correspond to the second surface 112b of the first manifold 112. Accordingly, the description of the angle $\alpha$, $\beta$ and the length d of the first surface 112a and the second surface 112b is equally applied to the angle $\alpha'$, $\beta'$ and the length d' of the third surface 132a and the fourth surface 132b.

That is, of the two surfaces, an angle between the third surface 132a closest to the upper slot 102 and the upper slot 102 is formed at the level of 30~70% of the fourth surface 132b following the third surface 132a. That is, when an angle between the third surface 132a and the upper slot 102 is $\alpha'$ and an angle between the fourth surface 132b and the upper slot 102 is $\beta'$, $\alpha'$ is at the level of 30~70% of $\beta'$. That is, the third surface 132a close to the upper exit port 102a is inclined more gently than the fourth surface 132b.

The length d' of the third surface 132a may be 15 mm or less. The angle $\alpha'$ between the third surface 132a and the upper slot 102 may be between 20° and 60°. In a preferred example, the angle $\alpha'$ between the third surface 132a and the upper slot 102 may be 30°, and the angle $\beta'$ between the fourth surface 132b and the upper slot 102 may be 60°.

According to the present disclosure, the flow of the second coating solution 60 in the second manifold 132 is uniform, and the residence time is minimized.

Although this embodiment describes applying the coating solution in two layers or performing pattern coating by supplying the coating solution in an alternating manner, it is obvious that the present disclosure may be applied to combination of two types of coating solutions in the middle of the slot or simultaneous coating of three or more layers using three or more slots, not dispensing through individual slots. It is obvious that four or more die blocks are needed for three or more slots.

Hereinafter, the influence of the manifold shape on the stagnation of the electrode active material slurry will be described in more detail by describing the conventional manifold as comparative example.

Figure 9:
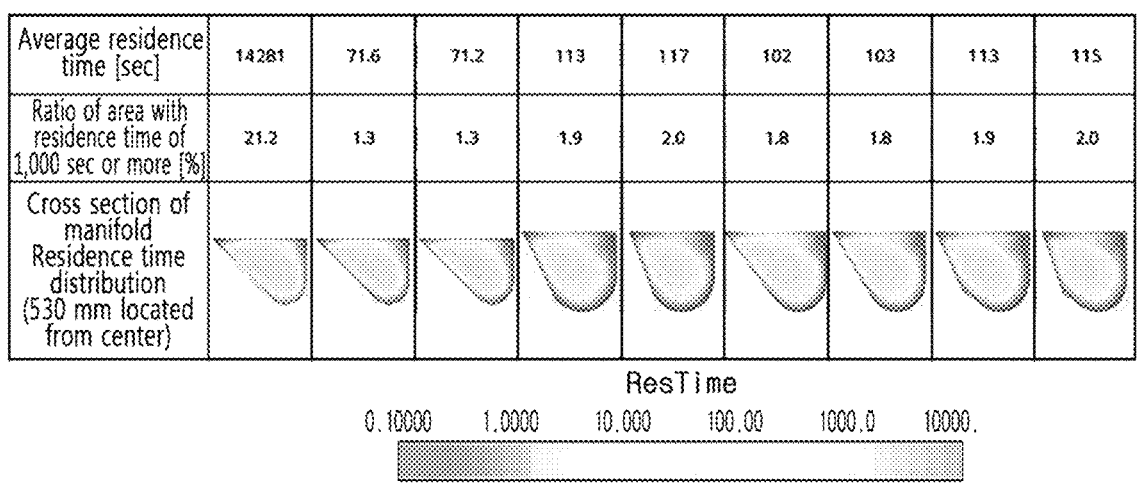
FIG. 9 shows changes in electrode active material residence time as a function of manifold shape.

FIG. 9 shows changes in the electrode active material residence time as a function of manifold shape. Simulation is performed with varying manifold shapes.

In the third line of FIG. 9, the cross section of the manifold is shown. The color (shade) indicates the residence time of the electrode active material slurry in the manifold (log scale).

As shown in FIG. 9, when the cross-sectional shape of the manifold changes, the average residence time and the ratio of area with the residence time of 1000 sec or more change. The residence time at the center of the inside of the manifold is between about 10 sec and about 100 sec, and the residence time at the surrounding area amounts to 1000 sec. The residence time at the outer area is 1000 sec or longer. That is, it can be seen that the residence time of the electrode active material slurry at the bottom surface of the manifold is longer than that of the inner area. Additionally, it can be seen that as the bottom surface of the manifold is narrower, the average residence time is longer. As described above, it can be seen that the cross-sectional shape of the manifold is very important in determining the electrode active material residence time.

Meanwhile, samples are tested by varying the angle α of the first surface 112a, the angle β of the second surface 112b, and the length d of the first surface 112a in the first manifold 112 to determine the average residence time of the electrode active material slurry in the first manifold 112 and the ratio of area with the residence time of 1000 sec or more. Simulation as shown in FIG. 9 is used.

Figure 8:
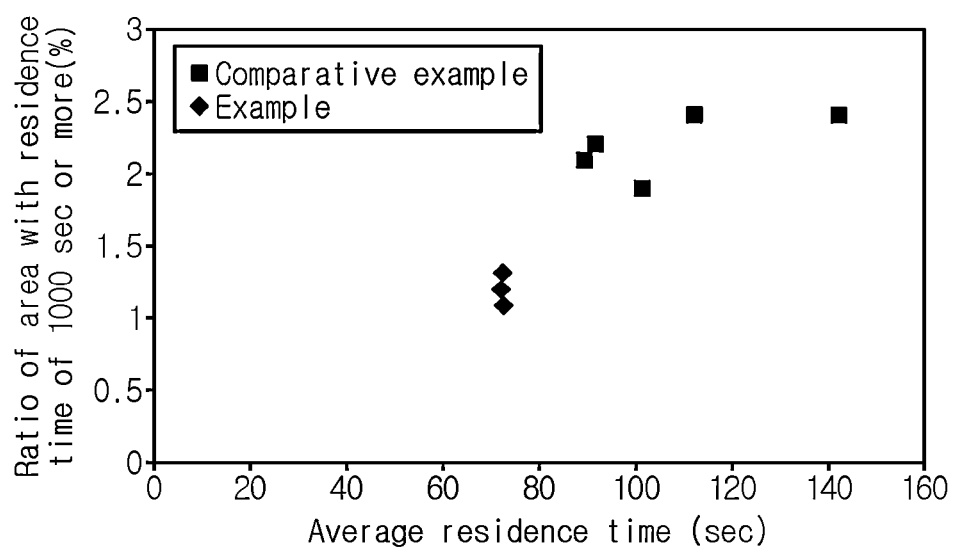
FIG. 8 is a graph showing a ratio of area with residence time of 1000 sec or more to average residence time in experimental example.

Table 1 summarizes the experimental conditions and results (the unit of α, β is °, the unit of d is mm, and the unit of the residence time is sec). FIG. 8 is a graph showing a ratio of area with the residence time of 1000 sec or more to the average residence time in experimental example.

TABLE 1

| Experimental example | Sample # | α | β | α/β | d | Average residence time | Ratio of area with residence time of 1,000 sec or more (%) |
|---|---|---|---|---|---|---|---|
| Example | 1 | 30 | 60 | 50% | 3 | 72.1 | 1.2 |
| Example | 2 | 20 | 60 | 33% | 3 | 72.4 | 1.3 |
| Example | 3 | 42 | 60 | 70% | 3 | 72.5 | 1.1 |
| Comparative example (Beyond angle range) | 4 | 15 | 60 | 25% | 3 | 91.5 | 2.2 |
| Comparative example (Beyond angle range) | 5 | 50 | 60 | 83% | 3 | 101.3 | 1.9 |
| Example | 6 | 30 | 60 | 50% | 10 | 74.4 | 1 |
| Comparative example (Beyond angle range) | 7 | 30 | 60 | 50% | 15 | 89.4 | 2.1 |

TABLE 1-continued

| Experimental example | Sample # | α | β | α/β | d | Average residence time | Ratio of area with residence time of 1,000 sec or more (%) |
|---|---|---|---|---|---|---|---|
| Comparative example (Beyond angle range) | 8 | 30 | 60 | 50% | 20 | 112.1 | 2.4 |
| Comparative example (Conventional) | 9 | 0 | 60 | 0% | 0 | 142 | 2.4 |

Samples 1 to 3 and 6 are examples, and satisfy the proposed angle relationship and length. Samples 4 and 5 are comparative examples, and do not satisfy the proposed angle relationship. Samples 7 and 8 are comparative examples, and are outside of the proposed length range of the first surface 112a. Sample 9 is comparative example, and has only one surface having a uniform angle in cross section toward the landing portion as in the conventional manifold described with reference to FIG. 3.

As shown in Table 1 and FIG. 8, the example of the present disclosure has a shorter average residence time than comparative example, and has a smaller ratio of area with the residence time of 1000 sec or more. Accordingly, according to the present disclosure, the flow of the electrode active material slurry in the manifold is uniform. It is possible to minimize the stagnation of the electrode active material slurry at any area in the manifold, thereby preventing agglomeration of the electrode active material slurry. As a result, it is possible to prevent widthwise loading deviation or the clogged exit port by the electrode active material slurry agglomerates due to the changed flow.

While the present disclosure has been described with respect to a limited number of embodiments and drawings, the present disclosure is not limited thereto, and it will be apparent to those skilled in the art that a variety of changes and modifications may be made thereto within the technical aspects of the present disclosure and the appended claims and their equivalent scope.

What is claimed is:

1. A multi-slot die coater comprising:
    a lower slot and an upper slot configured to extrude and coat a coating solution on a surface of a continuously moving substrate through at least one of the lower slot and the upper slot,
    a lower die block,
    an intermediate die block positioned on the lower die block such that the lower slot is formed between the intermediate die block and the lower die block,
    an upper die block positioned on the intermediate die block such that the upper slot is formed between the upper die block and the intermediate die block,
    a first manifold provided in the lower die block or the intermediate die block, in which a first coating solution is received, the first manifold being in communication with the lower slot; and
    a second manifold provided in the upper die block or the intermediate die block, in which a second coating solution is received, the second manifold being in communication with the upper slot,
    wherein the first manifold is a chamber of an inwardly recessed shape, and includes a first surface and a second surface at a location adjacent to the lower slot, the first surface and the second surface having different angles from each other with respect to the lower slot, and of the two surfaces, the angle of the first surface closest to the lower slot is 30-70% of the angle of the second surface following the first surface.

2. The multi-slot die coater according to claim 1, wherein the first surface is 15 mm or less in length.

3. The multi-slot die coater according to claim 1, wherein the angle between the first surface and the lower slot is between 20° and 60°.

4. The multi-slot die coater according to claim 1, wherein the angle between the first surface and the lower slot is 30°, and the angle between the second surface and the lower slot is 60°.

5. The multi-slot die coater according to claim 1, wherein the second manifold is a chamber of an inwardly recessed shape, and includes a third surface and a fourth surface at a location adjacent to the upper slot, the third surface and the fourth surface having different angles from each other with respect to the upper slot, and of the two surfaces, the angle of the third surface closest to the upper slot is 30-70% of the angle of the fourth surface following the third surface.

6. The multi-slot die coater according to claim 5, wherein the third surface is 15 mm or less in length.

7. The multi-slot die coater according to claim 5, wherein the angle between the third surface and the upper slot is between 20° and 60°.

8. The multi-slot die coater according to claim 5, wherein the angle between the third surface and the upper slot is 30°, and the angle between the fourth surface and the upper slot is 60°.

9. The multi-slot die coater according to claim 1, wherein the lower slot and the upper slot form an angle of 30° to 60°.

10. The multi-slot die coater according to claim 1, wherein the intermediate die block has a right-angled triangular shape in cross section along a movement direction of the substrate, and the first manifold is provided in the lower die block and the second manifold is provided in the upper die block.

* * * * *